United States Patent [19]

Kure

[11] Patent Number: 4,979,268
[45] Date of Patent: Dec. 25, 1990

[54] METHOD AND APPARATUS FOR THE MECHANICAL CLEANING OF FRESHLY CAUGHT ROUNDFISH

[75] Inventor: Ingvard Kure, Rønne, Denmark

[73] Assignee: Nordischer Maschinenbau Rud. Baader GmbH & Co KG, Lubeck, Fed. Rep. of Germany

[21] Appl. No.: 410,517

[22] Filed: Sep. 21, 1989

[30] Foreign Application Priority Data

Sep. 21, 1988 [DK] Denmark ............................. 5242/88

[51] Int. Cl.⁵ ............................................. A22C 25/18
[52] U.S. Cl. ................................................... 452/108
[58] Field of Search ..................... 17/52, 58, 55, 60, 63

[56] References Cited

U.S. PATENT DOCUMENTS

| | | | |
|---|---|---|---|
| 3,123,853 | 3/1964 | Radloff et al. | 16/63 |
| 3,364,517 | 1/1968 | Bartels | 17/55 |
| 3,570,047 | 3/1971 | Bartels | 17/58 |
| 3,972,091 | 8/1976 | Dohrendorf | 17/55 |
| 4,091,506 | 5/1978 | Soerensen et al. | 17/52 |

Primary Examiner—Willis Little
Attorney, Agent, or Firm—Fay, Sharpe, Beall, Fagan, Minnich & McKee

[57] ABSTRACT

A method and apparatus for mechanically cleaning freshly caught fish. In an initial step for preparing a throat cut in a roundfish, the head thereof is bent backwards to an angle of about 30° relatively to the axis of the trunk to stretch the neck and isthmus of the fish. A throat cut is then performed in two steps. The first step of the throat cut is started at the ventral side of the fish, closely ahead of the front edge of the collar bones of the fish in order to cut the isthmus joining the head and the trunk. Thereafter, the second step of the throat cut continues the first step of the cut by severing all the way into the gill cavity up to the spine and mainly following along the front edge of the collar bones. Subsequently, a belly cut is made which permits the evisceration of the entrails of the fish intact.

11 Claims, 3 Drawing Sheets

METHOD AND APPARATUS FOR THE MECHANICAL CLEANING OF FRESHLY CAUGHT ROUNDFISH

BACKGROUND OF THE INVENTION

1. Field of the Invention

The invention relates to a method for the mechanical cleaning of freshly caught roundfish, i.e. fish having a substantially round cross-section such as, in particular, cod, haddock, mackerel, whiting, perch, tuna and the like, which fish is fixed in a transportation unit, such as a revolving stand, the method involving one step in which the head of the fish is partially separated from the trunk by means of a throat cut reaching from the ventral side towards the spine, and another step performed subsequently in which the trunk of the fish is opened by means of a belly cut starting at the edge of the throat cut, allowing for eviscerating the entrails intact. The invention also relates to apparatus for performing such method.

2. Prior Art

Nowadays, slaughtering and cleaning of fish is carried out increasingly on board fishing vessels. Various methods and equipment have been suggested for the explicit purpose of reaching the fastest possible processing resulting in the highest possible yields. There should be a minimum amount of wasted fish meat and the entrails should be eviscerated intact in order to remain a quality raw material for the canning industry or the drug industry or for other purposes. Especially the throat cut is performed in such a way, that it produces a maximum meat yield and simultaneously is careful and efficient in cutting free the entrails. However, the throat cut brings about a damaging of the collar bones (clavicles), which extend in a curved manner and thus form an impediment to carrying out a rectilinear cut from the isthmus up to the spinal column. The damaging of the collar bones leads to a reduction in quality of the final fillet product to be obtained.

3. Objects of the Invention

It is a main object of the present invention to suggest a method which safeguards a preparation of the fish body for a subsequent decapitating operation such that high quality fillets can be produced.

In particular, it is an object of the invention to carry out the throat cut such that the collar bones or clavicles are not engaged by the throat cutting operation so as to leave these bones undamaged.

It is a further object of the invention to carry out the throat cutting effectively and at high yield.

SUMMARY OF THE INVENTION

According to the present invention, these objects are achieved in a method of the type outlined above in that the head of the fish, during or after securing the trunk of the fish in the transportation unit, is bent backwards, preferably by an angle of approximately 30° relative to the longitudinal direction of the trunk of the fish, in order to stretch the lower side of the neck, after which stretching the throat cut is carried out in two steps, the first of which is placing a first cut in the stretched part of the throat to extend approximately along the foreside of the lower part of the collar bones or clavicles and cutting the isthmus of the fish. The second step continues the first cut by making a completing second cut, reaching the spine and directed towards a point on the spine at or a short distance ahead of the collar bones.

The stretching of the lower side of the neck and especially of the isthmus, which on the ventral side is connecting the head of the fish with its trunk, and which has an increasing thickness in the direction towards the collar bone, results in a facilitated cutting of this isthmus with the desired precision because the stretching counteracts the tendency of the isthmus to give way to the knife used, normally a disk knife. When performing the cut, it is advisable to make it no deeper than required for safeguarding an exact and safe cutting of the isthmus. The isthmus may have a thickness of 10-15 mm in the plane of the cut. The through-cutting has the effect of releasing the ventral side of the fish from the strain caused by the stretching and consequently retracts from the cutting line creating an optimal initial shape for the introduction of the knife to execute the second or completing cut. This second cut must reach all the way up to the spine in order to ensure a proper severing of the gullet and the major blood vessels (aorta and cardinal veins). This second cut may, substantially, follow the collar bones (clavicles) without damaging them. In this way, the collar bones can serve as supporting elements for the parts of the trunk adjacent to the cut to the benefit of any subsequent manipulating, especially the belly opening cut, without damaging the entrails. The second cut must furthermore cut through the skin and membranes between the gill cavity and the abdominal cavity of the fish and the suspension for the liver. For this operation the stretching, caused by the backward bending of the head, is an advantage too, because the entrails are hoisted upwards relative to the trunk, as a consequence of being joined to the head.

In the above, it is presupposed that the head is kept joined to the trunk by means of the spine. One of the reasons they are kept joined is to keep the trunk securely fixed during the performance of the belly cut and, once accomplished, the pertoneum is torn in order to lay bare the stomach and intestines. When the head is of no such use any more, it may be separated from the trunk by means of a cut extending from the above-mentioned second cut or by means of a neck cut.

By the handling of the majority of the species of fish in question, it is an advantage if the first cut is directed at an angle of about 10°-15° forwardly in the direction of the fish head, and relative to the direction of the axis of the trunk. The apex of the angle thus being directed towards the belly side, and that at its starting point, the second cut has a larger angle, which angle is preferably increasing as the depth of the cut increases.

If, furthermore, the depth of the first cut is adjusted to compound to the thickness of the isthmus at the position of the incision, the very purpose of this manipulating step is ensured without any risk of damaging the collar bones or the intestines.

According to a preferred mode of the invention, the depth of incision of the knife performing the second cut may be controlled by the lower side of the spine. Such controlling may be carried out by having the edge of the knife protruding slightly relative to a guiding element interacting with the spine and preventing the knife from cutting insignificantly into the spine, yet allowing for a deeper cut into the adjacent soft parts.

The method may be performed in an apparatus comprising a revolving stand having a substantially vertical axis and including holding devices for fixing the fish trunks as well as cutting and cleaning tools arranged around the revolving stand for successive manipulation of the fish fixed in the holding devices. The term "substantially vertical" is meant to explain that the axis may be tilted somewhat away from the vertical, e.g. in order to make it easier for the operator to place the fish in the holding devices. Such apparatus being known in general, the apparatus according to the invention differs therefrom in that the revolving stand above each holding device includes a device for fixing the head of the fish in a position bent backwards in relation to the fixed trunk of the fish, and in that the apparatus in the direction of rotation of the revolving stand is equipped with an isthmus cutting knife with its cutting plane inclined 10°-15° relative to the axis of the trunk of the fish. The apparatus includes a second knife serving to perform a continuation of the isthmus cut and inclined at an angle larger than the first one relative to the axis of the trunk of the fish. By this apparatus the fish can be manipulated according to the above described method.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
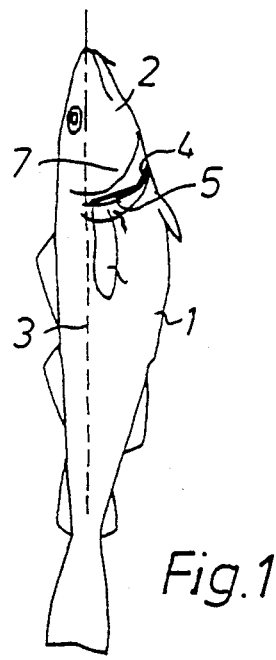
FIG. 1 shows a fish hanging approximately vertically in an apparatus designed according to the invention and with the desired throat cut marked.

FIG. 1 shows a cod, the trunk and head of which are marked with the reference numerals 1 and 2, respectively. These must be partly separated by means of a throat cut reaching from the ventral side to the spine 3, which throat cut includes a first part 4 and a second part 5, and which is placed closely in front of the collar bones 6 (clavicles) and between the gill covers 7 and pectoral fins 8 of the fish.

Figure 2:
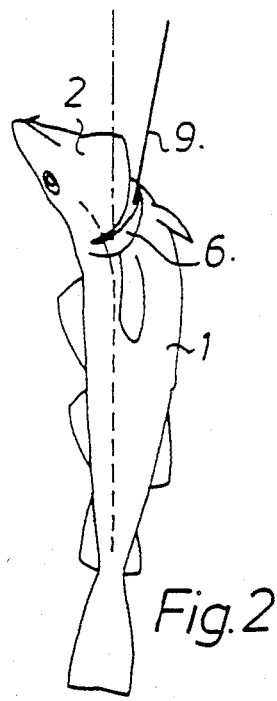
FIG. 2 shows the fish of FIG. 1 after the forcing back of the head and marking of the direction of the first part of the throat cut.

Before performing the first part 4 of the throat cut the head 2 of the fish is forced backwards as indicated in FIG. 2 so that the axis of the head and the axis of the trunk 1 are inclined relative to one another at an angle of about 30°. Thus, the isthmus, which joins the head and the trunk on the ventral side and is to be severed by means of the first cut closely in front of the collar bones 6, is stretched. A disk knife 9, whose cutting plane is indicated in the drawing, is inclined by 10°-15° in relation to the axis of the trunk of the fish. It performs this first cut, and is controlled in order to restrict the cut to the depth required for cutting through the isthmus. The knife may have an adjustable guide resting against the belly side of the fish in order to obtain a correct placing of the cut in the fish, dependent on its size.

Figure 3:
FIG. 3 is a representation similar to FIG. 2, but after finishing the first cut and with marking of the direction of cutting at the beginning of the second or completing part of the throat cut.

The severing of the isthmus has the effect that the belly part of the trunk below the cut 4 is somewhat lowered, giving space for inserting a disk knife 10 (cf. FIG. 3) for carrying out the second part 5 of the throat-cut, which second part is to continue the first part 4 to reach the ventral side of the spine 3. Furthermore the cut 5 should run closely in front of the collar bones 6 and therefore have a direction different from that of the cut 4. Thus the knife 10 in its initial position is inclined relative to the axis of the fish trunk at a larger angle. This angle of inclination may be increased during the execution of the cut 5. For this reason, the knife 10 may be suspended pivotally supported by a bearing placed above the head 2 of the fish and to the back of the axis of the trunk, so that the cutting edge of the knife 10, when penetrating into the fish, moves along a circular path having its tangent direction at the spine 3 approximately perpendicular to the backwardly bent part of the spine. The cut 5 should be taken all the way towards and perhaps slightly into the spine 3. The maximum depth of insertion of the knife 10 may therefore be controlled expediently by the ventral side of the spine 3 as explained above.

Due to the curving and the position of the cut 5 relative to the disk knife 10, the cut 5 will reach into the abdominal cavity of the fish to an extent that the membranes between the gill and the abdominal cavities, as well as the suspension of the liver, will be cut through securely without severing or otherwise damaging the clavicles. The term "the position of the cut 5" is meant to explain that the peripheral cutting point of the disk knife, i.e. the knife's lowest point when regarding the drawing, is moved into the fish in an inward direction having an angle relative to the plane of the disk knife.

Figure 4:
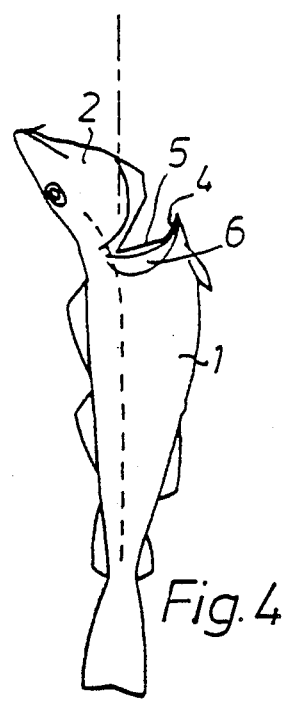
FIG. 4 shows the fish when ready for performing the belly cut.

After removing the knife 10, the condition of the fish is as shown in FIG. 4. The fish is now ready for the execution of the belly cut and for the tearing of the peritoneum by means of adequate tools, if necessary. The extended throat cut 4, 5 leaves optimal access for these tools, and at the same time, the collar bones 6 function as a reasonable support for the part of the trunk next to the cut, as this cut may be placed so that there are no soft parts above the collar bones.

Figure 5:
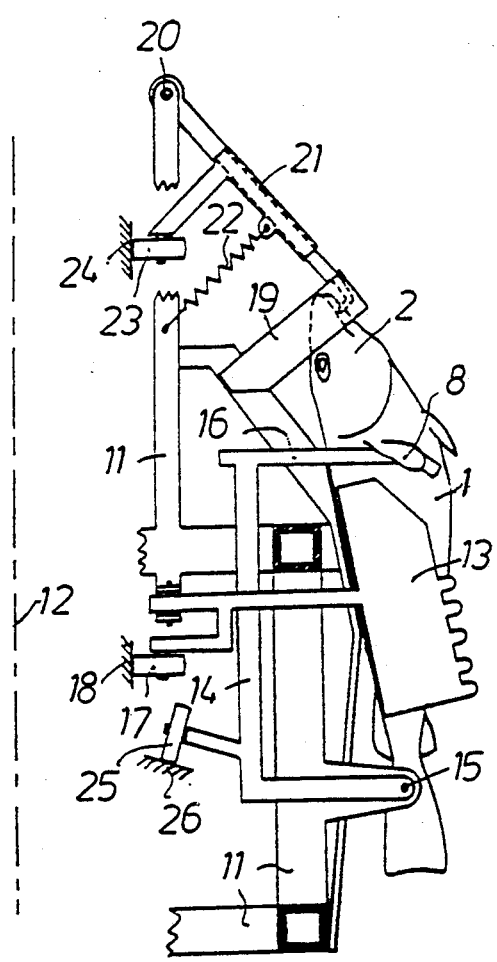
FIG. 5 shows a part of a revolving stand of an apparatus designed in accordance with the invention and comprising a holding device with a fish placed therein, but not yet fixed in order to perform the throat cut.
Figure 6:
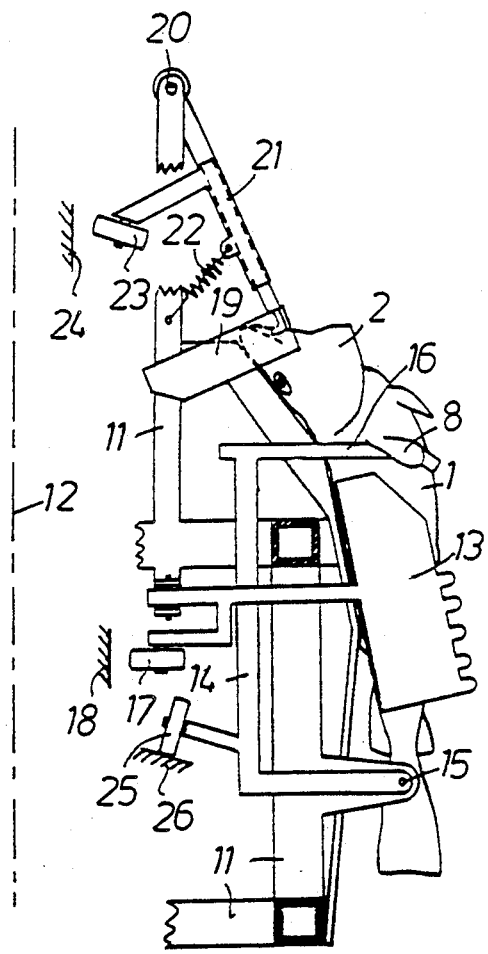
FIG. 6 shows the same details as FIG. 5, but after the fixing of the fish.

FIGS. 5 and 6 schematically show relevant parts of an embodiment of an apparatus for performing the method according to the invention. This apparatus comprises a revolving stand 11 having a substantially vertical axis 12 and a number of holding devices, of which only one is shown. These devices are arranged equidistantly along the perimeter of the revolving stand. Each holding device includes a pair of tongs having two plate-shaped jaws 13 for fixing of the trunk 1 of a fish body, and a bow 14 pivotally supported by a bearing 15 arranged on the frame 11. The bow 14 comprises, arranged at its upper end, a pair of outwardly extending arms 16 meant to reach under the pectoral fins 8 of the fish.

At the working station in which the fish is to be placed between the jaws 13 the pair of tongs are kept in an open position by a roll 17 interacting with a fixed guide or cam 18. When the roll 17 moves free of the guide 18 a spring (not shown) will close the pair of tongs about the trunk 1 thus fixing it within the revolving stand.

When the fish is placed between the jaws 13 its nose is run into a bow or ring 19 catching the nose and serving to pull the head 2 backwards into a position depicted in FIG. 6. For this purpose the bow 19 is mounted on a pivoting arm 21 supported by an upper bearing 20. The pivoting arm 21 is joined to a tension spring 22 providing a pull towards the axis 12. It is guided or controlled by a roll 23 interacting with a fixed guiding rail or cam 24. The bow 19 is telescopically mounted in the pivoting arm 21 so that it is able to move upwards from a lower starting position when a fish is fed into the holding device.

After performing the second cut 5 the bow 14 together with the arms 16 for the pectoral fins can be swung anticlockwise about its bearing 15 in order to give space for a third knife for cutting off the head 2 from the trunk 1, if so desired. This pivoting movement may be controlled by a roll 25 and a guide rail or cam 26 cooperating therewith.

The fish, manipulated and fixed as described above, may hereafter have its belly opened up by using a cutting tool (not shown) of a design known within the art and comprising a disk knife. The cutting tool is moved into the area of the abdominal cavity and towards the anus whilst being guided by suitable guides.

Those parts of the cutting edge of the disk knife which lie closest to the fish may be covered by suitable means, e.g. as shown in German Patent Specification No. 12 93 419, so as to prevent the intestines from being damaged and to ensure that the belly cut will end in the vicinity of the anus.

Figure 7:
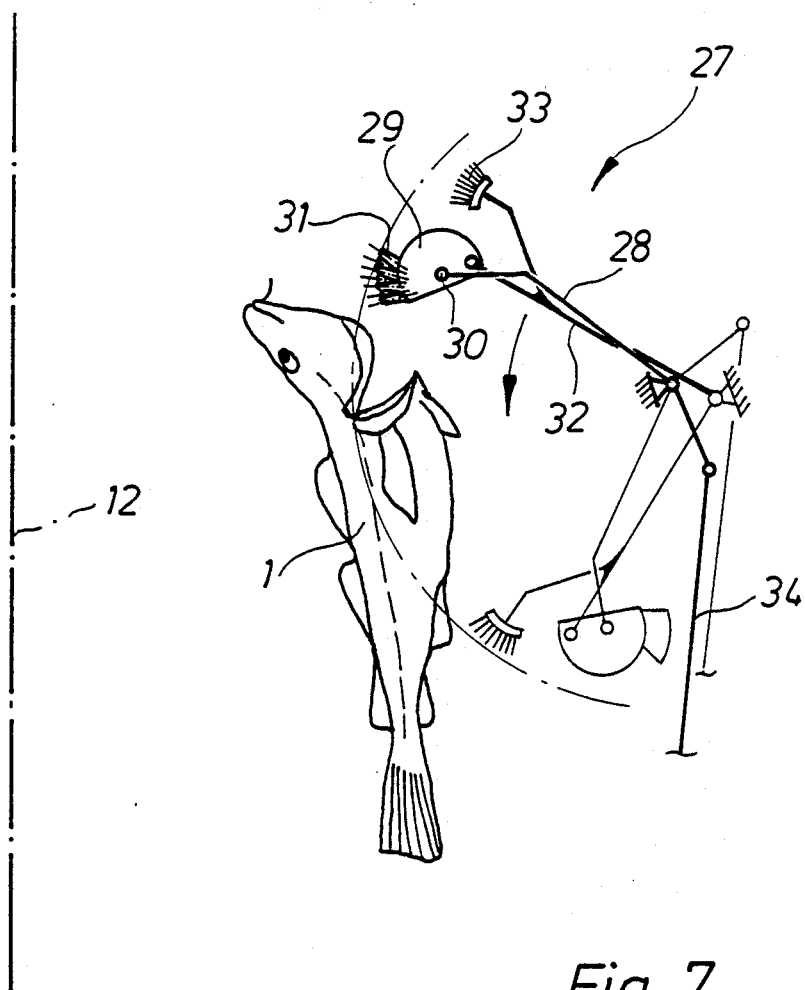
FIG. 7 shows cleaning tools for removing the entrails from the fish.

As shown in FIG. 7, the intestines may thereafter be removed in undamaged condition by means of a cleaning tool 27. This tool is fastened to a supporting arm 28 and comprises a roller element 29 fixed to a shaft 30 mounted on the supporting arm 28. A number of finger-like cleaning elements 31 are protruding substantially in a radial direction from part of the circumferential surface of the roller element 29. The cleaning elements are preferably made of a flexible material such as polyurethane and may have a rounded configuration at their free ends. The roller element 29 is actuated to perform a pivoting movement during its movement through the abdominal cavity. This pivoting movement is generated by means of a drop arm or drag-link lever 32 pivotally attached to the roller element 29 and is, at some point spaced therefrom, pivotally suspended from the frame of the apparatus. The drop arm 32 also carries a brush body 33, which is trailing the cleaning tool 27 and will remove residual parts of the intestines that may still remain attached to the inside of the abdominal cavity. The pivoting movement of the cleaning tool 27 may be derived from the rotation of the revolving stand 11 and may be transmitted by a push rod hinged to the supporting arm 28.

What is claimed is:

1. A method for the mechanical cleaning of freshly caught fish having a head, a trunk essentially defining a longitudinal direction of the fish, a neck having a lower side, a belly, collar bones forming part of the head adjacent to the trunk, a throat including an isthmus connecting the head and the trunk in the belly-side region of the fish, a spine, and entrails, the method comprising the steps of:
    (a) securing the trunk of a fish in a stand;
    (b) bending the head backwards by an angle of approximately 30° relative to the longitudinal direction of the trunk of the fish, in order to stretch the lower side of the neck;
    (c) partially separating the head from the trunk by making a throat cut in two steps reaching from the belly side of the fish towards its spine by performing:
        (c1) a first cut starting in the stretched part of the throat, running approximately along the foreside of the lower part of the collar bones and cutting the isthmus of the fish, and
        (c2) a completing, second cut continuing said first cut, reaching the spine and directed towards a point on the spine situated in the vicinity of the collar bones; and
    (d) subsequently opening the trunk by making a belly cut starting at the edge of said throat cut for eviscerating the entrails of the fish intact.

2. A method as claimed in claim 1, wherein said first cut is performed at a forwardly opening first angle of about 10°–15° relative to the longitudinal direction of the fish, and wherein said second cut, at its starting point, is performed at a second angle which is larger than said first one.

3. A method as claimed in claim 2, wherein said second angle of said second cut increases in correspondence with an increasing depth of the cut.

4. A method as claimed in claim 1, wherein the depth of said first cut is adjusted to correspond to the thickness of the isthmus as measured in the cutting plane.

5. A method as claimed in claim 1, wherein the depth of said second cut is controlled by the belly side surface of the spine of the fish.

6. A method as claimed in claim 1, wherein said second cut is performed by a disk knife the circumference of which is, whilst performing its cutting action, moved inwardly into the fish along the foreside of the collar bones and in a direction having an angle relative to a plane defined by said disk knife.

7. An apparatus for mechanically cleaning fish, comprising:
    a revolving stand having a substantially vertical axis, a number of holding devices for securing the trunks of fish, and at least one mechanical member for securing the head of a fish in a backwardly bent position relative to the position of a secured trunk of a fish arranged above each of said devices,
    cutting and cleaning tools arranged around the stand for successive manipulations of a fish secured in at least one of said holding devices,
    a first knife for cutting the throat of a fish secured in one of said holding devices at a position downstream of a position where the fish was initially secured by one of said holding devices, the plane of said first knife forming a first angle of 10° to 15° relative to an axis of the trunk of the fish,
    a second knife, located at a position downstream of the first knife, for continuing a throat cut started by the first knife, said second knife forming a second angle relative to the axis of the trunk of a fish which is larger than said first angle of the first knife.

8. An apparatus as claimed in claim 7, wherein said mechanical member for bending the head of the fish backwards comprises a bow for engaging a lower part of the nose of the fish, which bow, when the fish is placed in said holding device, can move in a direction of the axis of said revolving stand.

9. An apparatus as claimed in claim 8, wherein said bow is supported by a lower end of a telescopic rod that is pivotally mounted at an upper part to said revolving stand, and which, by the action of a spring, tends to move towards said axis, and which furthermore, during the rotation of said revolving stand, is guided by a cam-follower cooperating with a cam rail fixed relative to the frame of said apparatus.

10. An apparatus as claimed in claim 7, wherein said cleaning tool comprises a gutting tool mounted on a supporting arm, arranged substantially in a radial direction of said revolving stand and controlled into a path of the fish by a control means, said gutting tool including a roller element that rotates around an axis and carries at least over part of its outer surface, mainly protruding in a radial direction, gutting elements of fingerlike shape and preferably made of a flexible material, and wherein said gutting tool, when controlled into the path of the fish, is activated into a movement starting in an area of the opened gill cavity of the fish and passes through the opened abdominal cavity towards the anus of the fish, during which movement said roller element rotates about its axis.

11. An apparatus as claimed in claim 10, wherein said roller element is connected with a drop arm to cooperate therewith, which in turn forms a lever mechanism together with said supporting arm and said roller, and wherein said drop arm carries a brush body trailing said roller element when seen in the direction of movement of said gutting tool.

* * * * *